United States Patent
Ogose et al.

(10) Patent No.: US 10,426,152 B2
(45) Date of Patent: Oct. 1, 2019

(54) SPOOL BRAKE DEVICE

(71) Applicant: Shimano Inc., Sakai, Osaka (JP)

(72) Inventors: Hiroki Ogose, Osaka (JP); Akira Niitsuma, Osaka (JP); Yuichiro Ishikawa, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 201 days.

(21) Appl. No.: 15/788,585

(22) Filed: Oct. 19, 2017

(65) Prior Publication Data

US 2018/0199556 A1    Jul. 19, 2018

(30) Foreign Application Priority Data

Jan. 19, 2017    (JP) .................... 2017-007311

(51) Int. Cl.
*A01K 89/01*    (2006.01)
*A01K 89/033*    (2006.01)

(52) U.S. Cl.
CPC .................... *A01K 89/045* (2015.05)

(58) Field of Classification Search
CPC .......... A01K 89/01555; A01K 89/0155; A01K 89/045
See application file for complete search history.

(56) References Cited

U.S. PATENT DOCUMENTS

| | | | | |
|---|---|---|---|---|
| 6,045,076 A * | 4/2000 | Daniels | ............ | A01K 89/01555 188/268 |
| 6,412,722 B1 * | 7/2002 | Kreuser | ............ | A01K 89/01555 242/288 |
| 7,503,517 B2 * | 3/2009 | Ikuta | ................ | A01K 89/01555 242/286 |
| 7,648,096 B2 * | 1/2010 | Niitsuma | ......... | A01K 89/01555 242/286 |
| 7,712,695 B2 * | 5/2010 | Yusa | ................ | A01K 89/01555 242/223 |
| 9,101,121 B2 * | 8/2015 | Niitsuma | ......... | A01K 89/01555 |
| 2004/0148843 A1 * | 8/2004 | Ikuta | ................ | A01K 89/01555 43/21 |
| 2013/0037645 A1 * | 2/2013 | Niitsuma | ......... | A01K 89/01555 242/288 |
| 2016/0212981 A1 * | 7/2016 | Niitsuma | ......... | A01K 89/01556 |
| 2018/0199554 A1 * | 7/2018 | Ogose | ............. | A01K 89/01555 |

FOREIGN PATENT DOCUMENTS

JP    20090159847    7/2009

* cited by examiner

*Primary Examiner* — Emmanuel M Marcelo
(74) *Attorney, Agent, or Firm* — Jeff Mangels; Butler & Mitchell LLP; Brennan C. Swain, Esq.

(57) ABSTRACT

The spool brake device is equipped with a brake unit, a detector, and a controller. The controller controls the braking force by the brake unit based on the rotational speed of the spool detected by the detector. When the rotational speed is less than the predetermined rotational speed, the controller controls the braking force by the brake unit in the regular braking mode. In the regular braking mode, the controller changes the braking force by the brake unit according to the rotational speed. On the other hand, when the rotational speed is equal to or higher than the predetermined rotational speed, the controller controls the braking force by the brake unit in the emergency braking mode, during the period of predetermined time. In the emergency braking mode, the controller makes the braking force by the brake unit larger than the braking force in the regular braking mode.

17 Claims, 7 Drawing Sheets

SPOOL BRAKE DEVICE

FIELD OF THE INVENTION

The present invention relates to a spool brake device for a dual bearing reel.

BACKGROUND OF THE INVENTION

Dual bearing reels typically have a spool brake device for braking the spool in order to prevent backlash during casting. For example, see Japanese Unexamined Patent Application Publication No. 5122273, which is incorporated by reference herein in its entirety.

SUMMARY OF THE PREFERRED EMBODIMENTS

A spool brake device according to an aspect of the present invention is configured to brake a spool of a dual bearing reel. This spool brake device includes a brake unit, a detector, and a controller. The brake unit brakes the spool. The detector detects the rotational speed of the spool. The controller is configured to control the braking force by the brake unit based on the rotational speed of the spool detected by the detector. When the rotational speed is lower than the predetermined rotational speed, the controller controls the braking force by the brake unit in the regular braking mode. In the regular braking mode, the controller changes the braking force by the brake unit in accordance with the rotational speed. On the other hand, when the rotational speed is equal to or higher than the predetermined rotational speed, the controller controls the braking force by the brake unit in the emergency braking mode, during a period of predetermined period of time. In the emergency braking mode, the controller makes the braking force by the brake unit larger than the braking force in the regular braking mode.

According to this configuration, when the rotational speed of the spool is less than the predetermined rotational speed, the braking force by the brake unit is controlled in the regular braking mode, so that backlash during casting can be prevented. Also, when the rotational speed of the spool exceeds the predetermined rotational speed, the spool is braked with a braking force larger than the braking force in the regular braking mode, so that it is possible to prevent the rotational speed of the spool from becoming excessively high. That is to say, when the rotational speed of the spool exceeds the predetermined rotational speed, it is not that the braking force is changed according to the rotational speed of the spool, but braking is applied to the spool with a large braking force unrelated to the rotational speed of the spool. As a result, it becomes possible to prevent the rotational speed of the spool from becoming excessively high, and therefore it makes it possible to prevent line breakage during casting.

Preferably, in the emergency braking mode, when the rotational speed of the spool reaches a predetermined rotational speed, the controller is to increase the braking force by the brake unit to a preset maximum braking force and then it is to gradually decrease. Preferably, during the period of predetermined time, the controller controls the braking force by the brake unit in the regular braking mode after controlling the braking force by the brake unit in the emergency braking mode. Preferably, the detector detects an angular acceleration of the spool.

Additionally, when the rotational speed is equal to or higher than the predetermined rotational speed and the angular acceleration is equal to or higher than the predetermined angular acceleration, the controller controls the braking force by the brake unit in the emergency braking mode. According to this configuration, since the braking force is set in consideration of not only the rotation speed but also the angular acceleration, it is possible to more appropriately control the rotation speed of the spool.

According to the present invention, line breakage can be prevented while preventing backlash during casting. The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

It will be appreciated that terms such as "front," "back," "top," "bottom," "side," "short," "long," "up," "down," "left," "right" and "below" used herein are merely for ease of description and refer to the orientation of the components as shown in the figures. It should be understood that any orientation of the components described herein is within the scope of the present invention.

Figure 1:
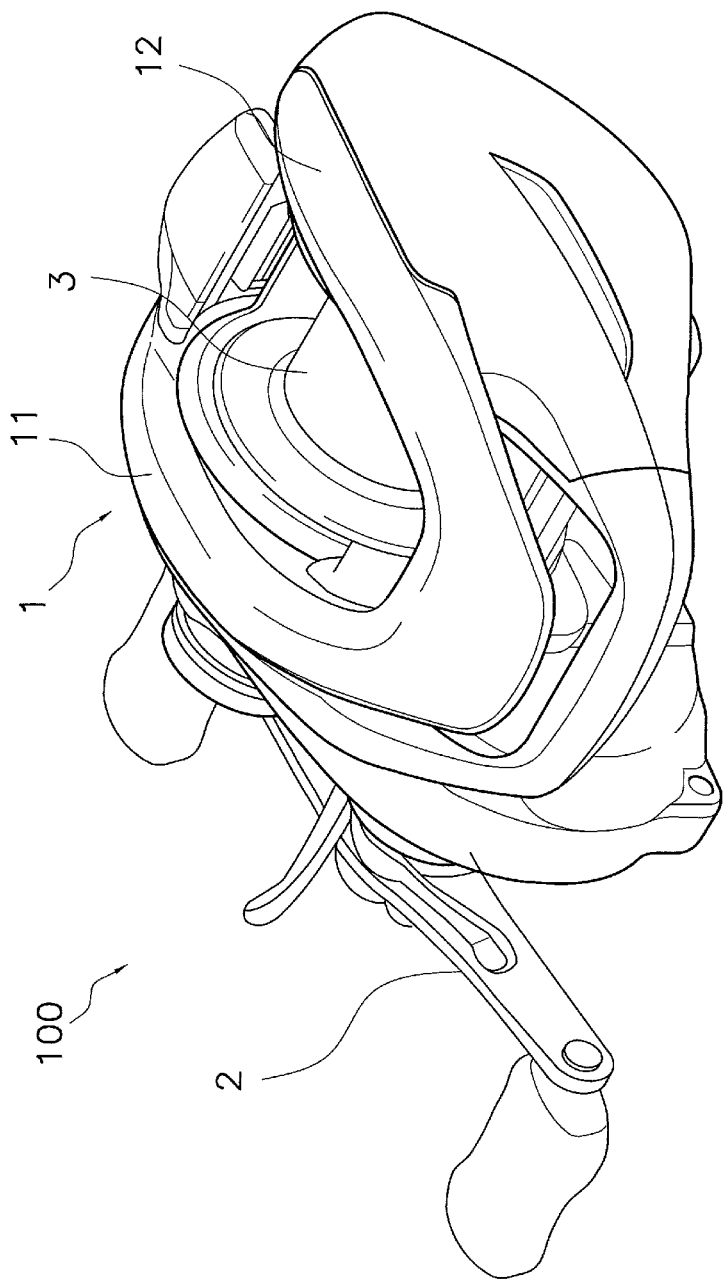
FIG. 1 is a perspective view of a dual bearing reel.
Figure 2:
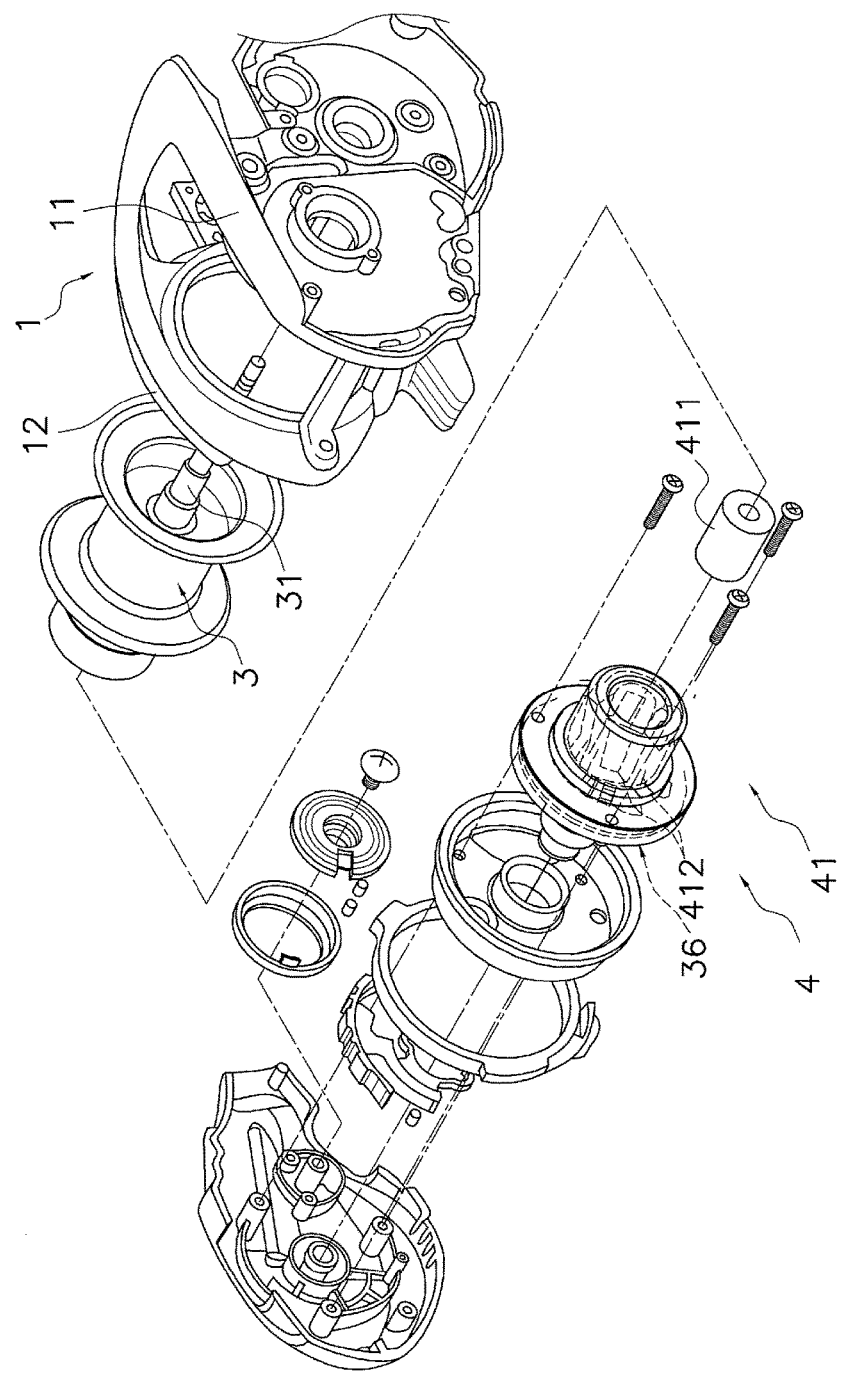
FIG. 2 is an exploded perspective view of a dual bearing reel.

Hereinafter, embodiments of a dual bearing reel in which a spool brake device according to the present invention is described with reference to the drawings. As shown in FIGS. 1 and 2, the dual bearing reel 100 includes a reel body 1, a handle 2, a spool 3, and a spool brake device 4.

The reel body 1 has a first reel body 11 and a second reel body 12. The first reel body 11 and the second reel body 12 are arranged at intervals from each other in the axial direction. The first reel body 11 accommodates a rotation transmission mechanism (not shown in the figure) for transmitting the rotation of the handle 2 to the spool 3.

The handle 2 is rotatably attached to the reel body 1. Specifically, the handle 2 is rotatably attached to the first reel body 11. The rotation of the handle 2 is to be transmitted to the spool 3 via the rotation transmission mechanism.

The spool 3 is rotatably supported by the reel body 1. The spool 3 is arranged between the first reel body 11 and the second reel body 12. Specifically, the spool 3 is attached to the spool shaft 31. The spool shaft 31 extends in the axial direction between the first reel body 11 and the second reel body 12. The spool shaft 31 is rotatably supported by the first reel body 11 and the second reel body 12.

Figure 3:
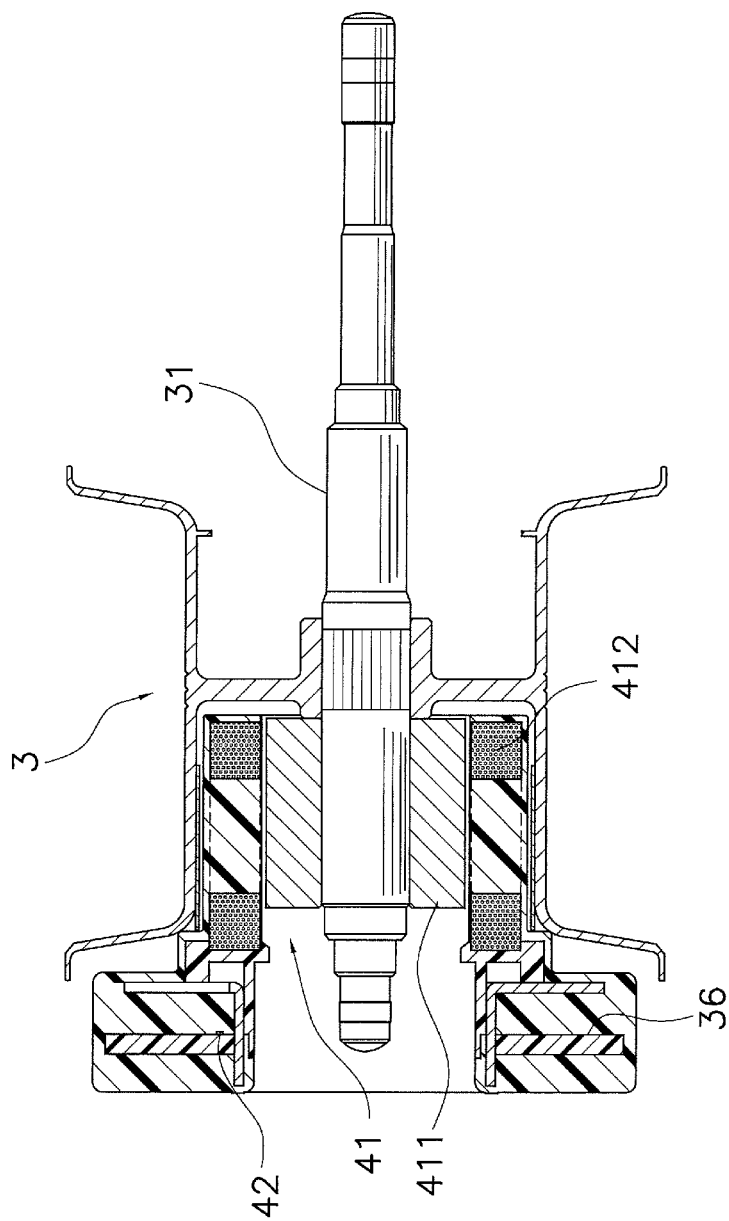
FIG. 3 is a cross section view of a brake unit.
Figure 4:
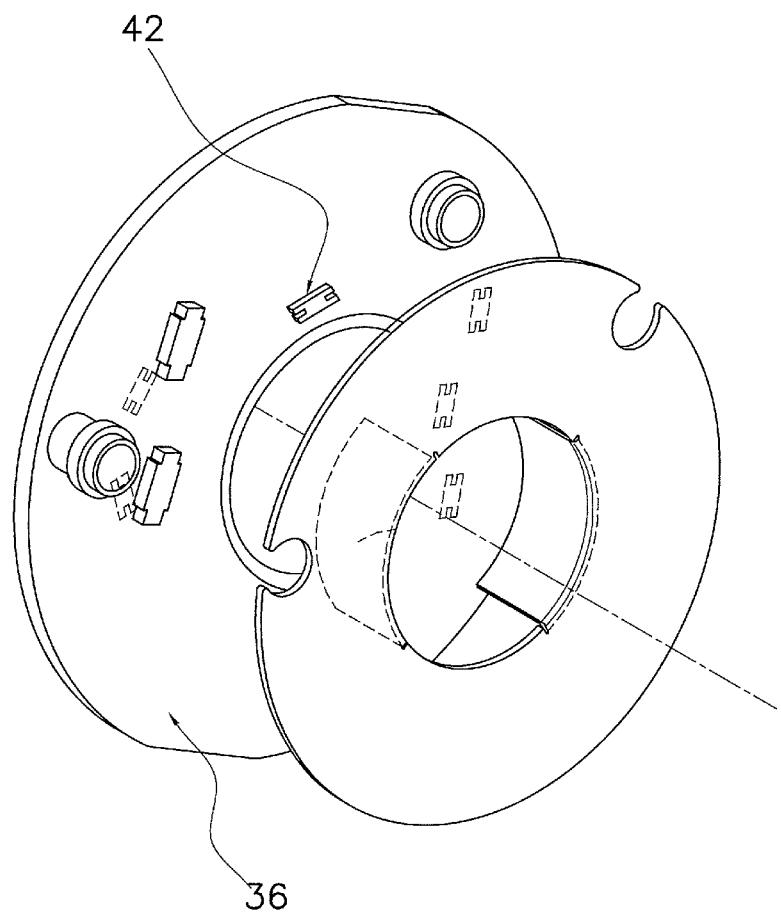
FIG. 4 is a perspective view of a circuit board to which a detector is attached.
Figure 5:
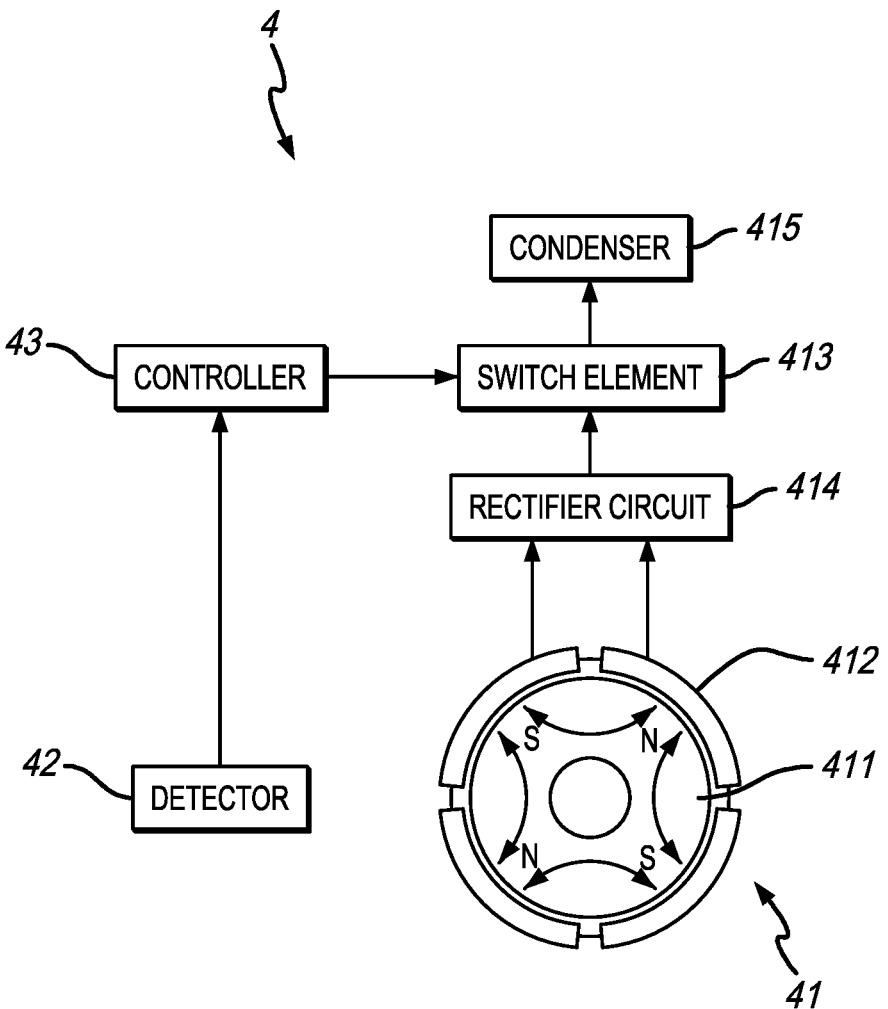
FIG. 5 is a block diagram of a spool brake device.

As shown in FIGS. 3-5, the spool brake device 4 is configured to brake the spool 3.

This spool brake device 4 includes a brake unit 41, a detector 42, and a controller 43. Further, the controller 43 is composed of, for example, a CPU (Central Processing Unit). That is to say, the controller 43 is a functional configuration realized by software. In addition, the controller 43 may be realized by hardware such as an electronic circuit, or may be realized by collaboration between software and hardware.

The brake unit 41 is configured to brake the spool 3 by magnetic and electrical control. Specifically, the brake unit 41 includes a magnet 411, a plurality of coils 412, and a switch element 413. The magnet 411 rotates integrally with the spool 3. The magnet 411 is, for example, fixed to the spool shaft 31. Further, it should be noted that the magnet 411 may be fixed to the spool 3. The magnet 411, for example, is cylindrical. The magnet 411 has a plurality of magnetic poles magnetized in a polar anisotropic manner. The magnetic poles of the magnet 411 are alternately arranged in the circumferential direction.

Each coil 412, for example, is connected in series to each other. The coils 412 are tubular.

The coils 412 are arranged radially outward of the magnet 411. The coils 412 and the magnet 411 are arranged at intervals from each other. The coils 412 are rotatably relative to the magnet 411. The coils 412 are to be attached to the circuit board 36. Further, in order to prevent cogging and to promote smooth rotation of the spool 3, coreless type coils 412 are adopted. Both ends of the plurality of serially connected coils 412 are to be electrically connected to the switch element 413 mounted on the circuit board 36. Each of the coils 412 is curved in an arc shape, and the plurality of coils 412 are arranged at intervals in the circumferential direction, and are formed in a substantially cylindrical shape as a whole. The switch element 413 is configured by, for example, a field-effect transistor.

The brake unit 41 turns on and off the current generated by the relative rotation between the magnet 411 and the coils 412 by the switch element 413, thereby changing the duty cycle and braking the spool 3. The braking force generated by the brake unit 41 becomes stronger as the time of the switch element 413 being on is longer (as the duty cycle D is larger).

As shown in FIG. 5, the switch element 413 is to be connected to the coils 412 via the rectifier circuit 414. Further, the switch element 413 is to be connected to the electric condenser 415. The condenser 415 stores electric power generated from the coils 412 at the time of casting. The storage element 415 functions as a power supply for supplying power to the detector 42. In addition, the condenser 415 also supplies electric power to the CPU and the like, which may comprise the controller 43. The storage element 415 is configured by, for example, an electrolytic capacitor.

As shown in FIGS. 3 and 4, the detector 42 is configured to detect the rotational speed of the spool 3. Specifically, the detector 42 generates an output signal corresponding to the rotational speed of the spool 3. For example, the detector 42 comprises a Hall element. The detector 42 is attached to the circuit board 36. The detector 42 is provided at a position facing the gap of each coil 412. The detector 42 becomes turned on and off according to a predetermined rotational position of the magnet 411. The detector 42 outputs the output signal to the controller 43.

As shown in FIG. 5, the controller 43 is configured to control the braking force by the brake unit 41 based on the rotational speed of the spool 3 detected by the detector 42. More specifically, the controller 43 calculates the rotational speed of the spool 3 based on the output signal from the detector 42. Then, the controller 43 determines whether or not the rotational speed of the spool 3 has reached the predetermined rotational speed. For example, the predetermined rotational speed is about 25,000 to 27,000 rpm.

Figure 6:
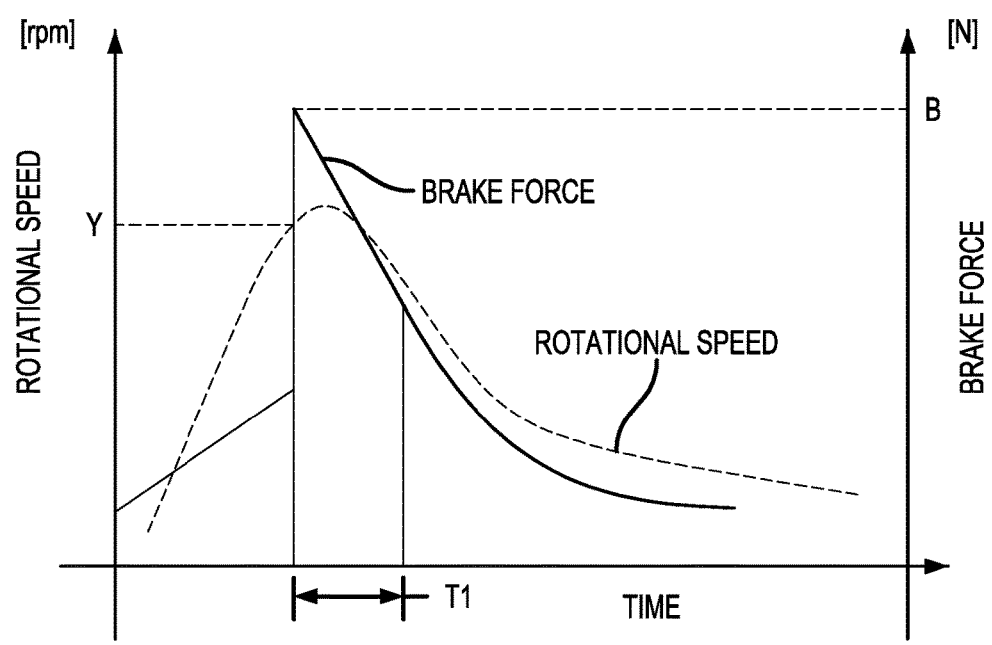
FIG. 6 is a graph showing rotational speed and braking force.

When the rotational speed of the spool 3 is less than the predetermined rotational speed, the controller 43 is to control the braking force by the brake unit 41 in the regular braking mode. In the regular braking mode, the controller 43 changes the braking force by the brake unit 41 according to the rotational speed of the spool 3. More specifically, as shown in FIG. 6, in the regular braking mode, the controller 43 controls the braking force so that the braking force also is to increase as the rotational speed increases. Further, the braking force information indicating the relationship between the rotational speed and the braking force in the regular braking mode is set in advance, and is stored in the controller 43 or other memory unit (not shown not shown in the figure) or the like.

Then, based on the braking force information, the controller 43 is to change the braking force by the brake unit 41 according to the rotational speed of the spool 3. When the rotational speed of the spool 3 is equal to or higher than the predetermined rotational speed, the controller 43 is to control the braking force by the brake unit 41 in the emergency braking mode, during or for a period of predetermined time. In the emergency braking mode, the controller 43 makes the braking force by the brake unit 41 larger than the braking force in the regular braking mode.

More specifically, as shown in FIG. 6, in the emergency braking mode, when the rotational speed of the spool 3 reaches the predetermined rotational speed Y, the controller 43 is to raise the braking force by the brake unit 41 to the maximum braking force B. Then, after raising the braking force to the maximum braking force B, the controller 43 gradually reduces the braking force. The controller 43 controls the braking force in the emergency braking mode only for the predetermined time T1 and returns to the regular braking mode and controls the braking force when the predetermined time T1 has elapsed.

As described above, the controller 43 fundamentally controls the braking force by the brake unit 41 in the regular braking mode. Then, the controller 43 is to control the braking force by the brake unit 41 in the emergency braking mode only during the predetermined time T1 after the rotational speed of the spool 3 reaches or exceeds the predetermined rotational speed Y.

Specifically, if the maximum braking force in the regular braking mode is set to about 8-10 mm Nm, the maximum braking force B max in the emergency braking mode may be set, for example, about 13-16 mm Nm. That is to say, the maximum braking force B max in the emergency braking mode is to increase, for example by about 50 to 60%, from the maximum braking force in the regular braking mode. The maximum braking force B max is set in advance, and is stored in the controller 43 and other memory unit (not shown in the figure) or the like.

Also, the reduction amount of the braking force after reaching the maximum braking force B max in the emergency braking mode is also set in advance, and is stored in the controller 43 or other memory unit (not shown in the figure) or the like. The controller 43 is able to change the braking force of the brake unit 41, for example, by duty controlling the switch element 413. The controller 43 may determine whether or not the dual bearing reel 100 has been cast based on the rotational speed of the spool 3 detected by the detector 42. For example, when the spool 3 rotates at a predetermined rotational speed or more in the line casting direction, the controller 43 determines that the dual bearing reel 100 has been cast.

Figure 7:
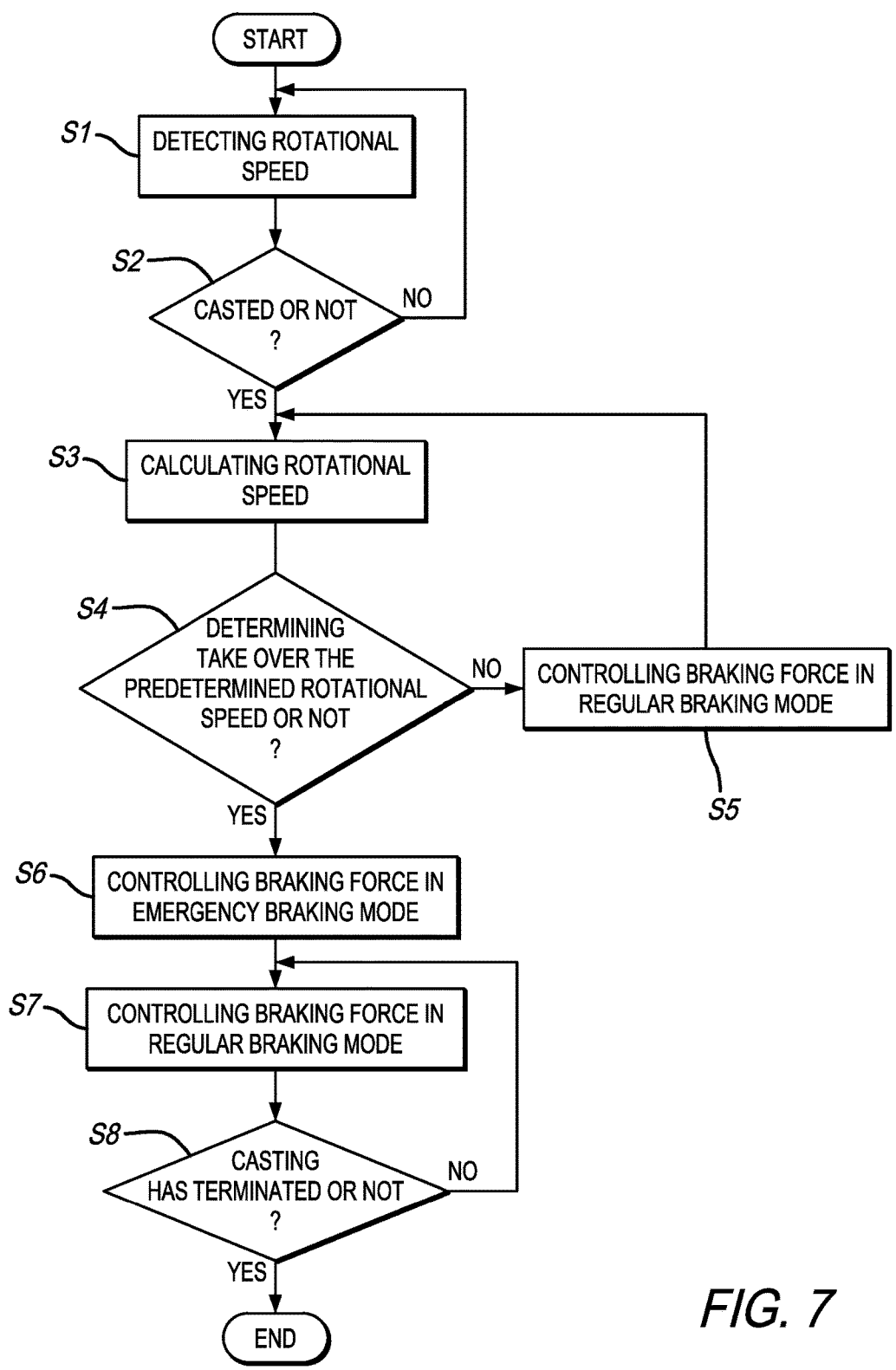
FIG. 7 is a flowchart showing the operation of a spool brake device.

Next, the action of the spool brake device 100 is to be described with reference to FIG. 7. The detector 42 detects the rotational speed of the spool 3 at predetermined time intervals (Step S1). More specifically, the detector 42 generates an output signal corresponding to the rotational speed, and outputs the output signal to the controller 43.

Next, based on the rotational speed of the spool 3 detected by the detector 42, the controller 43 determines whether or not the dual bearing reel 100 has been cast (Step S2). In the case where the controller 43 determines that the dual bearing reel 100 is not cast (No in Step S2), the process of Step S1 is to repeat again.

On the other hand, in the case where the controller 43 determines that the dual bearing reel 100 has been cast (Yes in Step S2), the controller 43 calculates the rotational speed of the spool 3 based on the output signal from the detector 42 (Step S3).

Then, the controller 43 is to determine whether the rotational speed is equal to or higher than (takes over) the predetermined rotational speed Y (Step S4). When the controller 43 determines that the rotational speed is less than the predetermined rotational speed Y in Step S4 (No in Step S4), the controller 43 is to control the braking force by the brake unit 41 in the regular braking mode (Step S5). That is to say, the controller 43 changes the braking force according to the rotational speed. Then, the process from Step S3 is to repeat again.

On the other hand, as a result of the determination in Step S4, when the controller 43 determines that the rotational speed is equal to or higher than the predetermined rotational speed Y (Yes in Step S4), the controller 43 is to control the braking force by the brake unit 41 (Step S6) in the emergency braking mode. More specifically, when the rotational speed of the spool reaches the predetermined rotational speed Y, the controller 43 is to increase the braking force by the brake unit 41 to a preset maximum braking force B, and thereafter gradually decreases.

Next, the controller 43 terminates the emergency braking mode after starting the emergency braking mode and the predetermined time T1 lapses. Then, the controller 43 is to control the braking force by the brake unit 41 again in the regular braking mode (Step S7).

Next, the controller 43 determines whether or not the casting has terminated (Step S8). When the controller 43 determines that the casting has terminated (Yes in Step S8), the spool brake device 4 terminates the braking of the spool 3. Further, for example, when the rotational speed of the spool 3 is less than the predetermined rotational speed, the controller 43 is to determine that the casting has terminated.

Although the embodiments of the present invention have been described above, the present invention is not limited to these embodiments, and a variety of modifications can be made without departing from the effect of the present invention.

Variation example 1—The detector 42 may detect the acceleration of the rotational speed of the spool 3, namely the angular acceleration. More specifically, the detector 42 outputs an output signal corresponding to the rotational speed of the spool 3 to the controller 43. The controller 43 calculates the angular acceleration of the spool 3 based on the output signal from the detector 42. Then, when the rotational speed is equal to or higher than the predetermined rotational speed Y and the angular acceleration is equal to or higher than the predetermined angular acceleration, the controller 43 controls the braking force by the brake unit 41 in the emergency braking mode. On the other hand, when the rotational speed is less than the predetermined rotational speed Y or the angular acceleration is less than the predetermined angular acceleration, the braking force by the brake unit 41 is controlled in the regular braking mode.

Variation example 2—The configuration of the brake unit 41 that brakes the spool 3 is not limited to the configuration of the above embodiment, and other configurations may be adopted.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:
1. A spool brake device for braking a spool of a dual bearing reel, the spool brake device comprising:
   a brake unit configured to brake the spool;
   a detector configured to detect a rotational speed of the spool; and a controller configured to control a braking force of the brake unit, wherein the braking force is controlled by the controller based on a detected rotational speed of the spool such that when the rotational speed of the spool is detected to be less than a first predetermined rotational speed, the controller sets the braking force according to a regular braking mode having a regular braking force, and when the rotational speed of the spool is detected to be equal to or higher than the first predetermined rotational speed, the controller sets the braking force according to an emergency braking mode having an emergency braking force, wherein the emergency braking force is greater than the regular braking force.

2. The spool brake device of claim 1 wherein the regular braking force is between about 8 millimeter Nm and about 10 millimeter Nm.

3. The spool brake device of claim 1 wherein the controller is configured to set the braking force to the emergency braking mode for a predetermined period of time.

4. The spool brake device of claim 3 wherein the braking force is decreased gradually during the predetermined period of time.

5. The spool brake device of claim 4 wherein the controller is configured to switch the brake unit from the emergency braking mode to the normal braking mode after the predetermined period of time has elapsed.

6. The spool brake device of claim 1 wherein the emergency braking force is about 50% to about 60% greater than the regular braking force.

7. The spool brake device of claim 1 wherein the controller is configured to terminate the braking of the spool when the rotational speed of the spool is less than a second predetermined rotational speed.

8. The spool brake device of claim 1 wherein the brake unit comprises:
   a magnet configured to rotate with the spool;
   a plurality of coils arranged radially outward relative to the magnet; and
   a switch element electrically coupled to the plurality of coils.

9. The spool brake device of claim 8 wherein the switch element is coupled to the plurality of coils via a rectifier circuit.

10. The spool brake device of claim 8 wherein the switch element further comprises a field-effect transistor.

11. The spool brake device of claim 8 wherein the switch element is electrically coupled to an condenser.

12. The spool brake device of claim 1 wherein the controller is configured to control the braking force in the regular braking mode in relation to the rotational speed of the spool, and wherein the controller is configured to control the braking force in the emergency braking mode in a manner unrelated to the rotational speed of the spool.

13. The spool brake device of claim 1 wherein the detector is further configured to detect the rotational speed of the spool at predetermined time intervals.

14. The spool brake device of claim 1 wherein the detector further comprises a hall element.

15. The spool brake device of claim 1 wherein the first predetermined rotational speed is between about 25,000 rpm and about 27,000 rpm.

16. The spool brake device of claim 1 wherein the detector is configured to detect an angular acceleration of the spool, wherein when the rotational speed is equal to or higher than the predetermined rotational speed and the angular acceleration is equal to or higher than a predetermined angular acceleration, the controller sets the braking force according to the emergency braking force.

17. A dual bearing reel comprising:
a reel body;
a spool coupled to the reel body;
a handle coupled to the reel body; and
a spool brake device comprising:
   a brake unit configured to electrically brake the spool of the spool brake device;
   a detector configured to detect a rotational speed of the spool; and
   a controller configured to control a braking force of the brake unit,
   wherein the braking force is controlled by the controller based on a detected rotational speed of the spool such that when the rotational speed of the spool is detected to be less than a predetermined rotational speed, the controller sets the braking force according to a regular braking mode having a regular braking force, and when the rotational speed of the spool is detected to be equal to or higher than the predetermined rotational speed, the controller sets the braking force according to an emergency braking mode having an emergency braking force, wherein the emergency braking force is greater than the regular braking force.

* * * * *